US006634328B2

(12) United States Patent
Russell et al.

(10) Patent No.: US 6,634,328 B2
(45) Date of Patent: Oct. 21, 2003

(54) ENGINE METHOD

(75) Inventors: John David Russell, Farmington Hills, MI (US); Allan Joseph Kotwicki, Williamsburg, MI (US); Brian D. Rutkowski, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/292,421

(22) Filed: Nov. 12, 2002

(65) Prior Publication Data

US 2003/0075127 A1 Apr. 24, 2003

Related U.S. Application Data

(62) Division of application No. 09/420,323, filed on Oct. 18, 1999.

(51) Int. Cl.$^7$ .................................................. F01L 1/34
(52) U.S. Cl. ..................... 123/90.15; 123/442; 123/306
(58) Field of Search ........................... 123/90.16, 90.15, 123/442, 306, 559.1; 60/600, 611

(56) References Cited

U.S. PATENT DOCUMENTS

| | | |
|---|---|---|
| 3,548,798 A | 12/1970 | Fleischer et al. |
| 4,084,568 A | 4/1978 | Sato et al. |
| 4,494,506 A | 1/1985 | Hayama et al. |
| 4,592,315 A | 6/1986 | Kobayashi et al. |
| 4,651,684 A | 3/1987 | Masuda et al. |
| 4,700,684 A | 10/1987 | Pischinger et al. |
| 4,856,465 A | 8/1989 | Denz et al. |
| 5,019,989 A | 5/1991 | Ueda et al. |
| 5,022,357 A | 6/1991 | Kawamura |
| 5,101,786 A | 4/1992 | Kamio et al. |
| 5,115,782 A | 5/1992 | Klinke et al. |
| 5,152,267 A | 10/1992 | Komatsu et al. |

(List continued on next page.)

FOREIGN PATENT DOCUMENTS

| | | |
|---|---|---|
| DE | 3916605 A | 11/1989 |
| DE | 4209684 A | 9/1993 |
| DE | 4321413 A1 | 1/1995 |
| DE | 19847851 | 4/1999 |
| EP | 0376703 A2 | 7/1990 |
| EP | 0440314 A2 | 8/1991 |
| EP | 0560476 A1 | 9/1993 |
| EP | 0990775 A1 | 4/2000 |
| EP | 1020625 A2 | 7/2000 |

(List continued on next page.)

Primary Examiner—John Kwon
(74) Attorney, Agent, or Firm—Daly, Crowley & Mofford, LLP

(57) ABSTRACT

A method for controlling an engine having both an electronically controlled inlet device, such as an electronic throttle unite, and an electronically controlled outlet device, such as a variable cam timing system is disclosed. The method of the present invention achieves cylinder air charge control that is faster than possible by using an inlet device alone. In other words, the method of the present invention controls cylinder air charge faster than manifold dynamics by coordination of the inlet and outlet device. This improved control is used to improve various engine control functions.

16 Claims, 10 Drawing Sheets

U.S. PATENT DOCUMENTS

| | | |
|---|---|---|
| 5,168,851 A | 12/1992 | Itoyama et al. |
| 5,170,759 A | 12/1992 | Ito |
| 5,199,403 A | 4/1993 | Akazaki et al. |
| 5,357,932 A | 10/1994 | Clinton et al. |
| 5,365,908 A | 11/1994 | Takii et al. |
| 5,396,874 A | 3/1995 | Hitomi et al. |
| 5,414,994 A | 5/1995 | Cullen et al. |
| 5,548,995 A | 8/1996 | Clinton et al. |
| 5,606,960 A | 3/1997 | Takahashi et al. |
| 5,628,290 A | 5/1997 | Iida et al. |
| 5,635,634 A | 6/1997 | Reuschenbach et al. |
| 5,654,501 A | 8/1997 | Grizzle et al. |
| 5,666,916 A | 9/1997 | Fugieda et al. |
| 5,676,112 A | 10/1997 | Bauer et al. |
| 5,690,071 A | 11/1997 | Jankovic |
| 5,692,471 A | 12/1997 | Zhang |
| 5,712,786 A | 1/1998 | Ueda |
| 5,724,927 A | 3/1998 | Suzuki |
| 5,740,045 A | 4/1998 | Livshiz et al. |
| 5,746,176 A | 5/1998 | Damson et al. |
| 5,758,493 A | 6/1998 | Asik et al. |
| 5,765,527 A | 6/1998 | Lehner et al. |
| 5,803,043 A | 9/1998 | Bayron et al. |
| 5,848,529 A | 12/1998 | Katoh et al. |
| 5,857,437 A | 1/1999 | Yoshioka |
| 5,896,840 A | 4/1999 | Takahashi |
| 5,913,298 A | 6/1999 | Yoshikawa |
| 5,950,603 A | 9/1999 | Cook et al. |
| 5,957,096 A | 9/1999 | Clarke et al. |
| 5,964,201 A | 10/1999 | Dickers et al. |
| 5,967,114 A | 10/1999 | Yasuoka |
| 6,000,375 A | 12/1999 | Isobe |
| 6,006,724 A | 12/1999 | Takahashi et al. |
| 6,006,725 A | 12/1999 | Stefanopoulou et al. |
| 6,009,851 A | 1/2000 | Iida et al. |
| 6,024,069 A | 2/2000 | Yoshino |
| 6,039,026 A | 3/2000 | Shiraishi et al. |
| 6,055,476 A | 4/2000 | Yoshino |
| 6,058,906 A | 5/2000 | Yoshino |
| 6,070,567 A | 6/2000 | Kakizaki et al. |
| 6,095,117 A | 8/2000 | Minowa et al. |
| 6,101,993 A | 8/2000 | Lewis et al. |
| 6,148,791 A | 11/2000 | Fujieda et al. |
| 6,170,475 B1 | 1/2001 | Lewis et al. |
| 6,178,371 B1 | 1/2001 | Light et al. |
| 6,182,636 B1 | 2/2001 | Russell et al. |
| 6,196,173 B1 | 3/2001 | Takahashi et al. |
| 2001/0013329 A1 | 8/2001 | Matsumoto et al. |

FOREIGN PATENT DOCUMENTS

| | | |
|---|---|---|
| GB | 2315571 A | 2/1998 |
| GB | 2338085 A | 12/1999 |
| JP | 59-194058 A | 11/1984 |
| JP | 60-240828 A | 11/1985 |
| JP | 62-101825 | 5/1987 |
| JP | 63-032122 | 2/1988 |
| JP | 1-100316 | 4/1989 |
| JP | 2-176115 A | 7/1990 |
| JP | 3-009021 A | 1/1991 |
| JP | 4-143410 A | 5/1992 |
| JP | 4-148023 A | 5/1992 |
| JP | 5-086913 A | 4/1993 |
| JP | 9-125994 A | 5/1997 |
| JP | 9-256880 A | 9/1997 |
| JP | 9-303165 | 11/1997 |
| JP | 10-37772 | 2/1998 |
| JP | 10-220256 A | 8/1998 |
| JP | 10-288055 | 10/1998 |
| JP | 10-288056 A | 10/1998 |
| JP | 11-062643 | 3/1999 |
| JP | 11-270368 A | 10/1999 |
| WO | 99/47800 A1 | 9/1999 |

ENGINE METHOD

RELATED PATENT APPLICATIONS

This is a divisional of patent application Ser. No. 09/420,323 filed Oct. 18, 1999.

FIELD OF THE INVENTION

The field of the invention relates to engine airflow and torque control in internal combustion engines.

BACKGROUND OF THE INVENTION

In some engines, an electronically controlled throttle is used for improved performance. In particular, the electronic throttle is used to control airflow to a desired value determined from operating conditions and an operator command. In this way, the vehicle can achieve improved drive feel and improved fuel economy.

In this system, the required airflow is used to determine an initial setting of the throttle. Also, a difference between required airflow and actual measured airflow is used to adjust the initial setting of the throttle. Thus, the throttle is used to control airflow and thereby engine torque. Such a system is described in U.S. Pat. No. 5,019,989.

The inventors herein have recognized a disadvantage with the above approach. In particular, a disadvantage with using throttle position is that the throttle cannot quickly change engine torque since the throttle controls flow entering an intake manifold. Controlling flow entering the manifold cannot rapidly control cylinder charge due to manifold volume. For example, if the throttle is instantly closed, cylinder air charge does not instantly decrease to zero. The engine must pump down the air stored in the manifold, which takes a certain number of revolutions. Therefore, the cylinder air charge gradually decreases toward zero.

Also, other methods are known for controlling engine torque where ignition timing is used. In particular, to maximize fuel economy, ignition timing should be at MBT timing (ignition timing for maximum torque). However, when at this point, adjustment of ignition timing in any direction decreases engine torque and fuel economy. Therefore, when maximizing fuel economy, engine torque can be rapidly increased. To be able to use ignition timing in both positive and negative directions, ignition timing must be set away from MBT timing. This allows rapid engine torque control, but at the cost of degraded fuel economy.

SUMMARY OF THE INVENTION

An object of the present invention is to rapidly control engine airflow.

The above object is achieved and disadvantages of prior approaches overcome by a method for controlling an engine airflow, the engine having at least one cylinder, the engine also having an intake manifold and an outlet control device for controlling flow from the intake manifold into the cylinder, comprising: generating a desired flow into the cylinder; and adjusting the outlet control device to provide said desired flow into the cylinder.

By using an outlet control device that controls flow exiting the manifold (entering the cylinder), it is possible to rapidly change engine airflow, despite response delays of airflow inducted through the intake manifold. Further, by responding to a request for flow entering the cylinder, more accurate and rapid control can be achieved. In other words, a rapid change in cylinder charge can be achieved, thereby providing a rapid change in engine torque.

An advantage of the above aspect of the invention is faster airflow and cylinder air charge control.

Another advantage of the above aspect of the invention is that manifold volume does not limit the maximum rate of change of engine airflow.

In another aspect of the present invention, the above object is achieved, and disadvantages of prior approaches overcome by a method for controlling an engine airflow, the engine having at least one cylinder, the engine also having an intake manifold and an outlet control device for controlling flow from the intake manifold into the cylinder and an inlet control device for controlling flow into the intake manifold, comprising: generating a desired cylinder air amount; and adjusting both the inlet control device and the outlet control device to provide said desired cylinder air amount.

By changing both the inlet and outlet control devices, it is possible to rapidly change engine airflow and cylinder air charge despite response delays of airflow inducted through the intake manifold. In other words, the present invention controls manifold inlet and outlet flows in a coordinated way to allow a rapid change in cylinder air charge regardless of manifold volume.

An advantage of the above aspect of the invention is that by using both an outlet and an inlet control device, a more controlled rapid change in engine airflow can be achieved.

In yet another aspect of the present invention, the above object is achieved and disadvantages of prior approaches overcome by a method for controlling an engine airflow, the engine having at least one cylinder, the engine also having an intake manifold and an outlet control device for controlling flow from the intake manifold into the cylinder, comprising: generating a desired engine torque; generating a desired cylinder air charge amount based on said desired engine torque; and changing the outlet control device to provide said desired cylinder air charge amount and thereby provide said desired engine torque.

In still another aspect, the present invention comprises a method for controlling an engine airflow, the engine having at least one cylinder, the engine also having an intake manifold and an outlet control device for controlling flow from the intake manifold into the cylinder, comprising: generating a desired change of engine torque; generating a desired cylinder air charge amount based on said desired change of engine torque; and changing the outlet control device to provide said desired cylinder air charge amount and thereby cause a change of engine torque.

By changing both the inlet and outlet control devices, it is possible to rapidly change engine torque despite response delays of airflow inducted through the intake manifold.

An advantage of the above aspect of the invention is that rapid engine torque control can be achieved without degraded fuel economy.

Another advantage of the present invention is improved fuel economy.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF PREFERRED EMBODIMENT(S)

Figure 1A:
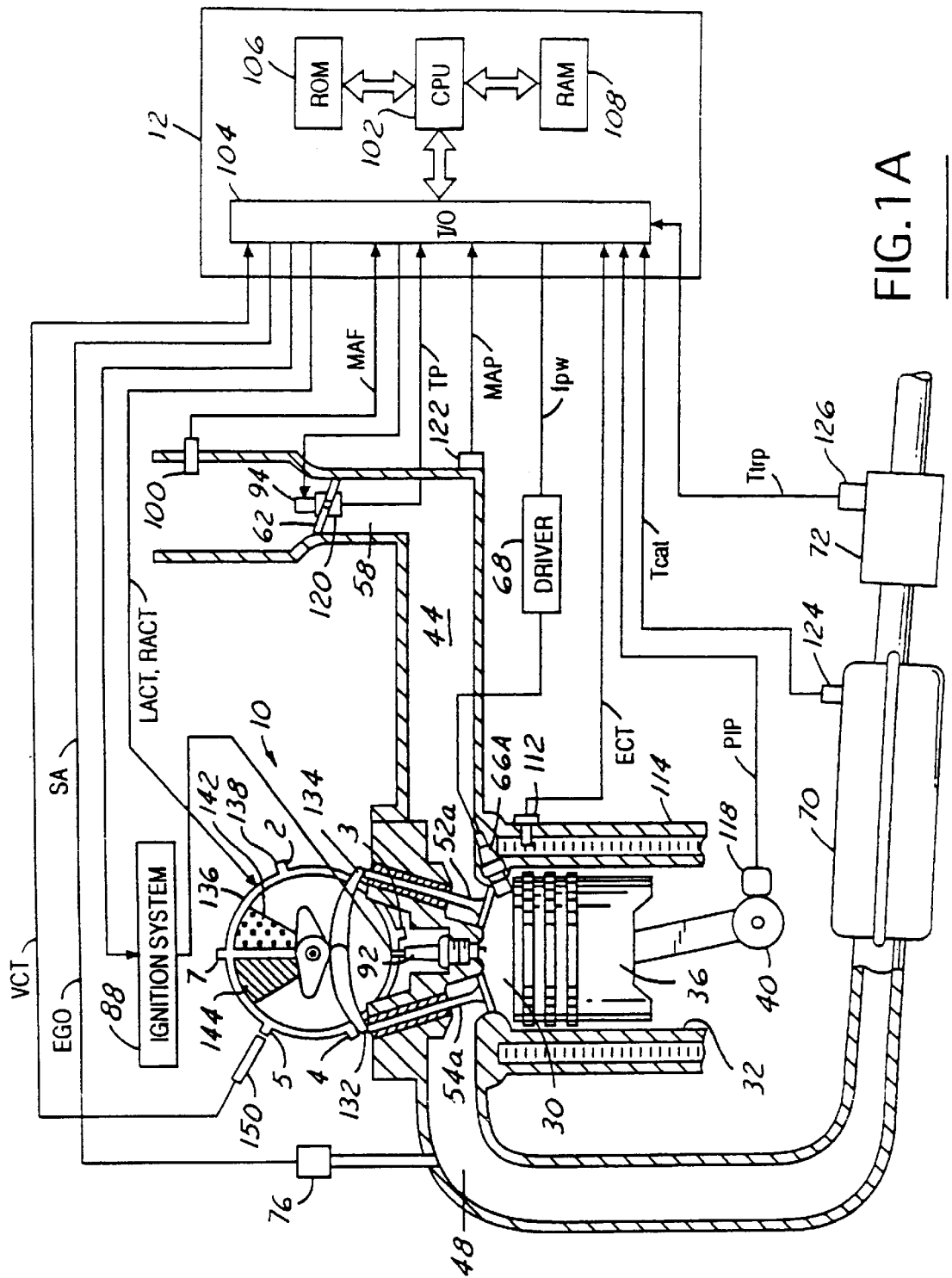
FIGS. 1A and 1B are a block diagrams of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1A including combustion chamber walls 32 with piston 36 positioned therein and connected to crankshaft 40. In this particular example piston 30 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering liquid fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke se that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1A as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAP) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. In a preferred aspect of the present invention, sensor 118, which is also used as an engine speed sensor, produces a predetermined number of equally spaced pulses every revolution of the crankshaft.

In this particular example, temperature Tcat of catalytic converter 70 and temperature Ttrp of NOx trap 72 are inferred from engine operation as disclosed in U.S. Pat. No. 5,414,994 the specification of which is incorporated herein by reference. In an alternate embodiment, temperature Tcat is provided by temperature sensor 124 and temperature Ttrp is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52*a*, 52*b* and exhaust valves 54*a*, 54*b* open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52*a*, 52*b* and exhaust valves 54*a*, 54*b* open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification, as described later herein. In addition, Controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Figure 1B:
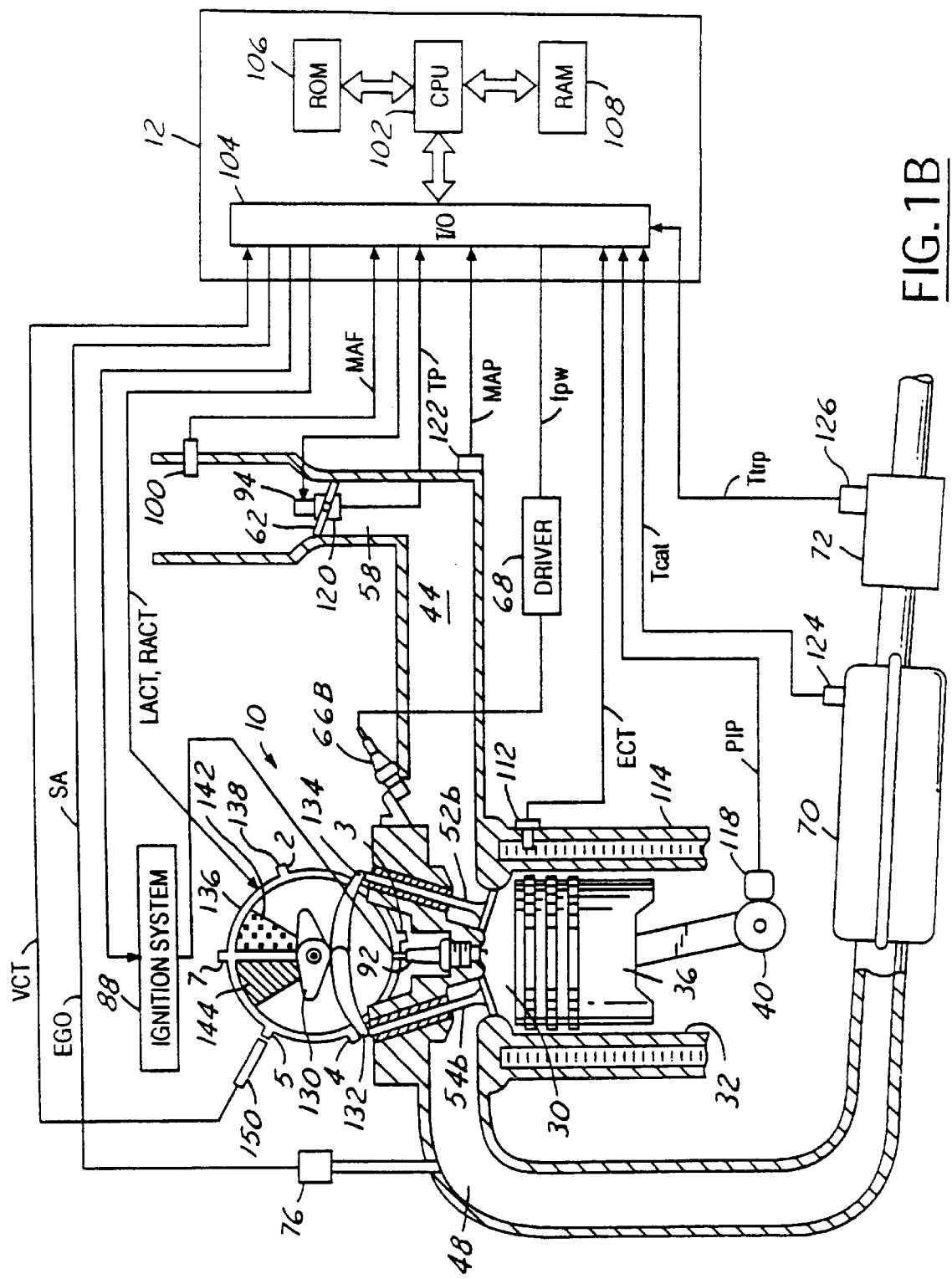

Referring now to FIG. 1B, a port fuel injection configuration is shown where fuel injector 66B is coupled to intake manifold 44, rather than directly cylinder 30.

Figure 2A:
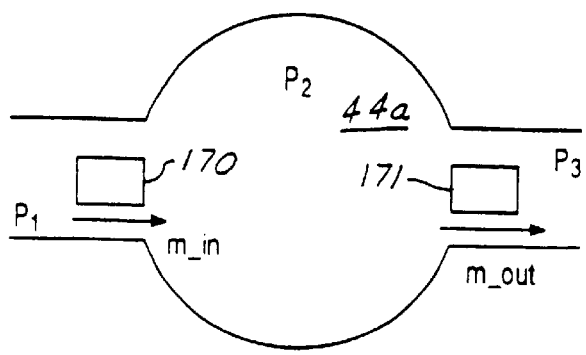
FIG. 2A is a block diagram of an embodiment in which the invention is used to advantage.

Referring now to FIG. 2A, a more general diagram shows manifold 44*a*, with inlet flow, m_in, and outlet flow, m_out. Inlet flow, m_in, is governed by inlet control device 170. Outlet flow, m_out, is governed by outlet flow device 171. In a preferred embodiment, manifold 44*a* is an intake manifold of an engine, inlet control device 170 is a throttle, and outlet control device 171 is a variable cam timing mechanism. However, as one skilled in the art would recognize, there are many alternative embodiments of the present invention. For example, outlet control device could be a swirl control valve, a variable valve timing mechanism, a variable valve lift mechanism, or an electronically controlled intake valve used in camless engine technology.

Continuing with FIG. 2A, there are other variables that affect flow entering and exiting manifold 44*a*. For example, pressures p1 and p2, along with inlet control device 170, determine flow m_in. Similarly, pressures p2 and p3, along with outlet device 171 determine flow m_out. Therefore, flow storage in manifold 44*a*, which dictates how fast pressure p2 can change, affects flow m_out. In an example where manifold 44*a* is an intake manifold of an engine operating at stoichiometry, flow m_out represents flow entering a cylinder and is directly proportional to engine torque.

Figure 2B:
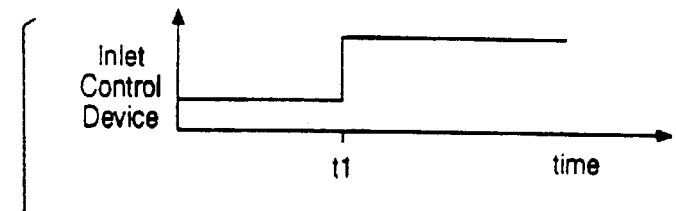
FIGS. 2B–2O are graphs describing operation of the embodiment in FIG. 2A.
Figure 2C:
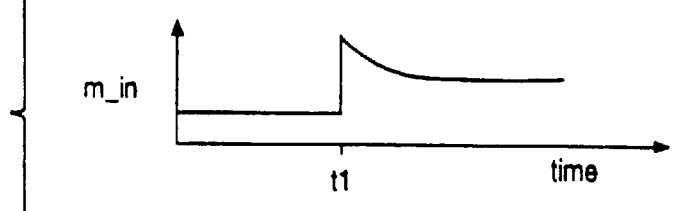
Figure 2D:
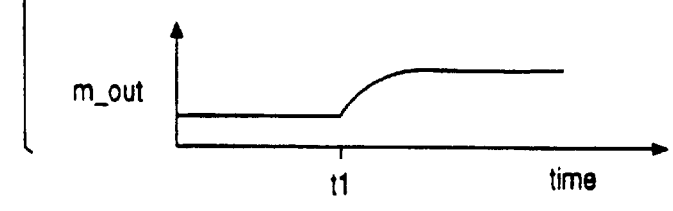

FIGS. 2B–2K illustrate the effect of such interrelationships on system performance. In FIG. 2B, inlet control device 170 is rapidly changed at time t1. The resulting change in outlet flow (m_out) is shown in FIG. 2C. The resulting change in inlet flow (m_in) is shown in FIG. 2D. This example has outlet control device 171 fixed, and therefore represents conventional engine operation and prior art operation where throttle position is used to control outlet flow (m_out). In this example, a rapid change in inlet control device 170 does not produce an equally rapid change in exit flow m_out.

Figure 2E:
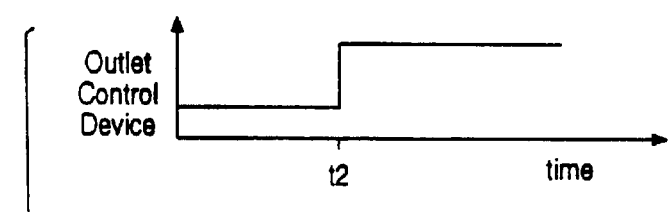
Figure 2F:
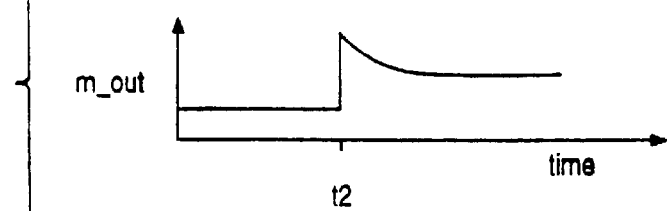
Figure 2G:
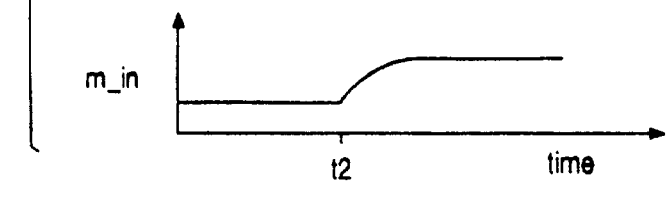

According to the present invention, in FIG. 2E, outlet control device 171 is rapidly changed at time t2. The resulting change in outlet flow (m_out) is shown in FIG. 2F. The resulting change in inlet flow (m_in) is shown in FIG. 2G. This example has inlet control device 170 fixed, and therefore represents adjustment of outlet device 170 only to control outlet flow (m_out). In this example, a rapid change in outlet control device 170 does produce an equally rapid change in exit flow m_out. However, the rapid change is not completely sustained.

Figure 2H:
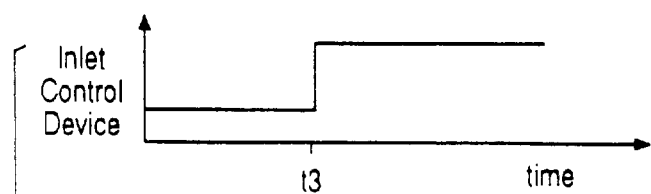
Figure 2I:
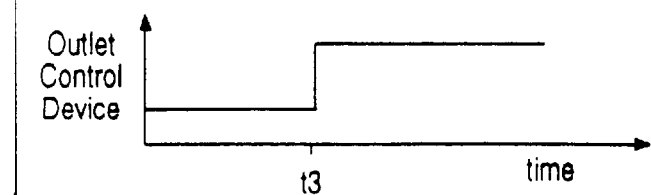
Figure 2J:
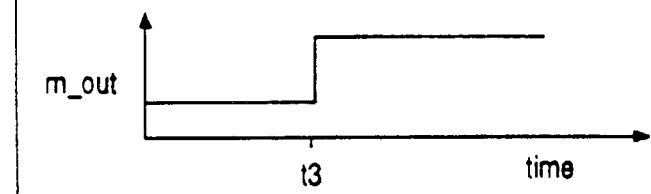
Figure 2K:
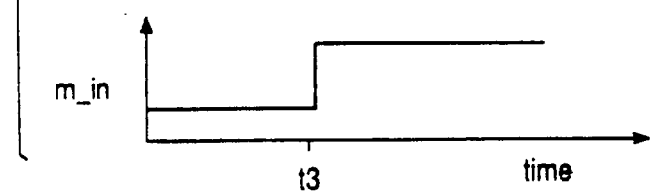

According to the present invention, in FIG. 2H, inlet control device 170 is rapidly changed at time t3. Similarly, in FIG. 2I, outlet control device 171 is rapidly changed at time t3. The resulting change in outlet flow (m_out) is shown in FIG. 2J. The resulting change in inlet flow (m_in) is shown in FIG. 2K. This example varies both inlet control device 170 and outlet control device 170 concurrently. In this example, a rapid change in both inlet control device and 170 outlet control device 171 does produce an equally rapid change in exit flow m_out, where the rapid change is sustained.

Figure 2L:
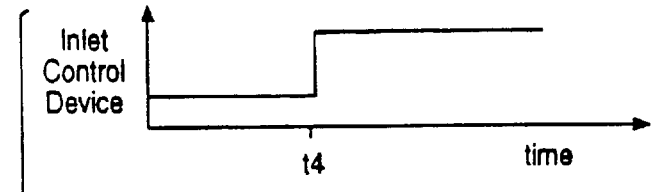
Figure 2M:
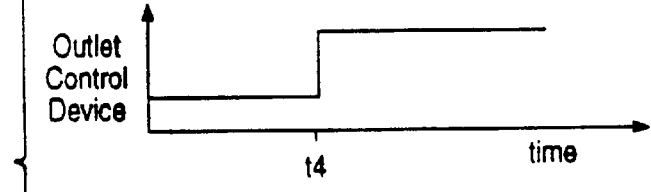
Figure 2N:
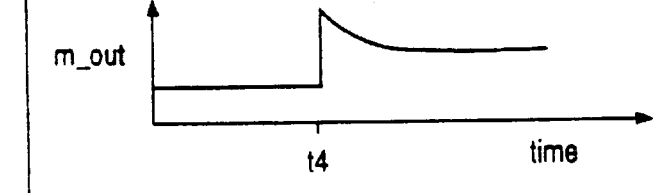
Figure 2O:
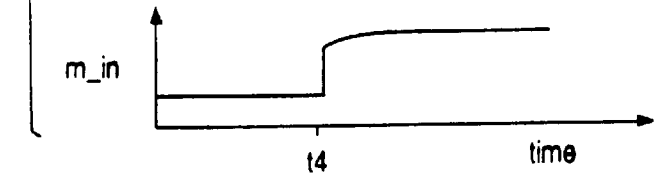

According to the present invention, in FIG. 2L, inlet control device 170 is rapidly changed at time t4. Similarly, in FIG. 2M, outlet control device 171 is rapidly changed at time t4 to a greater extent than in FIG. 2I. The resulting change in outlet flow (m_out) is shown in FIG. 2N. The resulting change in inlet flow (m_in) is shown in FIG. 2O. This example varies both inlet control device 170 and outlet control device 170 concurrently. In this example, a rapid change in both inlet control device and 170 outlet control device 171 does produce an equally rapid change in exit flow m_out, where the rapid change is sustained and actually produces a certain amount of peak, or overshoot. This represents how the present invention can be used to not only rapidly produce an increase in outlet flow, but to also add an overshoot. Thus, a control system according to the present invention can therefore generate a airflow lead control. Such lead control is advantageous for engine idle speed control to counteract engine inertia, or for vehicle launch conditions, to give improved drive feel.

According to the present invention, by using an outlet control device it is possible to rapidly control flow exiting a manifold. Further, by controlling both an inlet and outlet control device it is possible to more accurately rapidly-control flow exiting a manifold in various shapes.

In cases where engine 10 operates at a stoichiometric air/fuel ratio, then engine torque directly proportional to cylinder charge, which is in turn proportional to exit flow m_out and engine speed. Thus, according to the present invention, by controlling engine airflow to a desired value.

Engine Idle Speed Control

Figure 3:
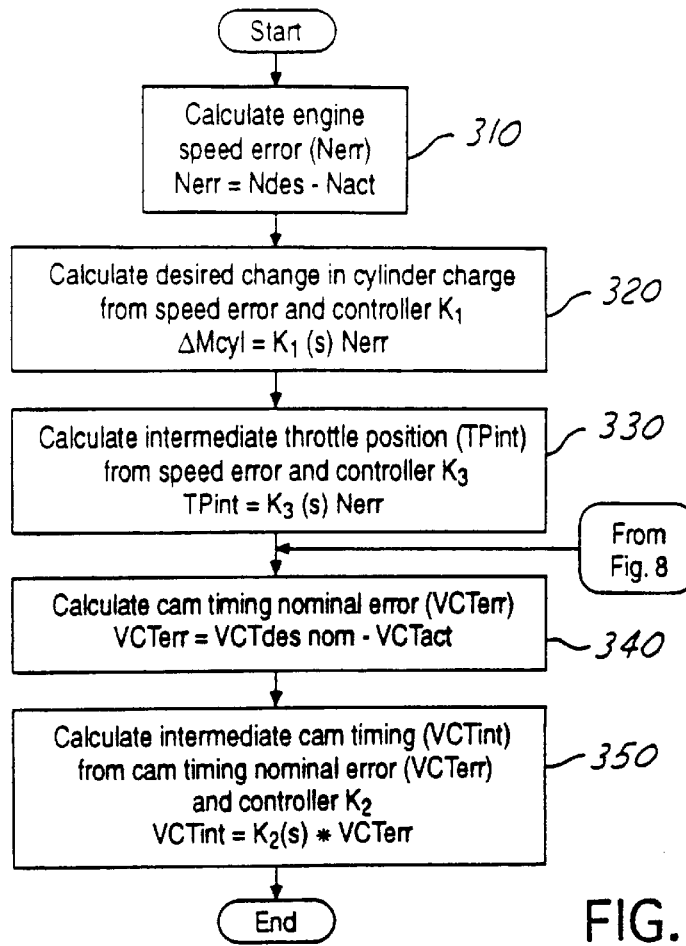
FIGS. 3–5, 8–10 are high level flowcharts which perform a portion of operation of the embodiment shown in FIGS. 1A, 1B, and 2A.

Referring now to FIG. 3, a routine is described for controlling engine speed using both throttle position and cam timing. In step 310, an engine speed error (Nerr) is calculated based on a difference between the desired engine speed (Ndes) and an actual engine speed (Nact). Then, in step 320, the desired change in cylinder charge is calculated from speed error using controller K1, where controller K1 is represented in the Laplace domain as K1(s) as is known to those skilled in the art. The desired in cylinder charge ($\Delta$mcyl) is preferably calculated using a proportional controller. Therefore, in the preferred embodiment, controller K1 represents a proportional controller. However, as those skilled in the art will recognize, various other control schemes can be used in place of proportional controller K1. For example, proportional integral derivative controllers, or sliding mode controllers, or any other controllers known to those skilled in the art, can be used. Next, in step 330, an intermediate throttle position (Tpint) is calculated from speed error and controller K3. As described above, various controllers can be used for controller K3. In a preferred embodiment, controller K3 is an integral controller. Next, in step 340, a nominal cam timing error (VCTerr) is calculated based on a difference between a desired nominal cam timing (VCTdesnom) and an actual cam timing (VCTact). Desired nominal cam timing (VCTdesnom) can be determined based on operating conditions, for example, based on idle mode, or drive mode. Also, desired nominal cam timing (VCTdesnom) can be set as a function of desired engine torque, or any other steady state scheduling method known to those skilled in the art. Next, in step 350, an intermediate timing (VCTint) is calculated from nominal cam timing error and controller K2. Controller K2 can be any controller known to those skilled in the art. In the preferred embodiment, controller K2 is a proportional integral controller.

Figure 4:
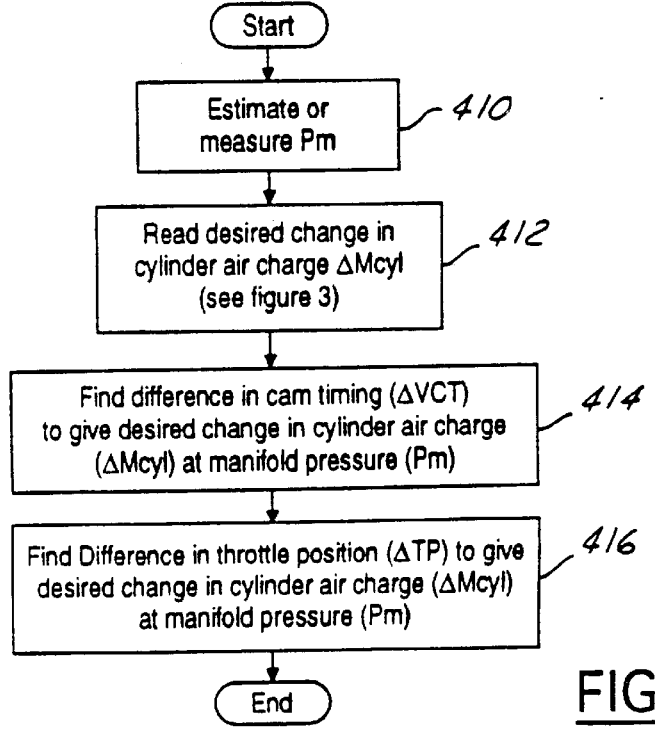

Referring now to FIG. 4, a routine is described for calculating adjustments to cam timing and throttle position to rapidly change cylinder charge. First, in step 410, manifold pressure (Pm) is estimated or measured using sensor 122. In the preferred embodiment, manifold pressure (Pm) is estimated using methods known to those skilled in the art. For example, manifold pressure can be estimated using signal MAF from mass airflow sensor 100, engine speed, and other signals known to those skilled in the art to effect manifold pressure. Next, in step 412, the desired change in cylinder charge ($\Delta$ncyl) is read from FIG. 3. Next, in step 414, a change in cam timing ($\Delta$VCT) is determined to give the desired change in cylinder charge at manifold pressure (Pm) read in step 410. Step 414 is performed using maps relating to cam timing, cylinder charge, and manifold pressure. The maps can be determined theoretically using engine models or measured using engine test data. Next, in step 416, a change in throttle position ($\Delta$TP) is determined to give the desired change in cylinder charge ($\Delta$ncyl) at manifold pressure (Pm) determined in step 410. Step 416 is similarly performed using characteristic maps relating parameters, throttle position, cylinder charge, and manifold pressure. The maps can be determined either using engine models or engine test data.

Figure 5:
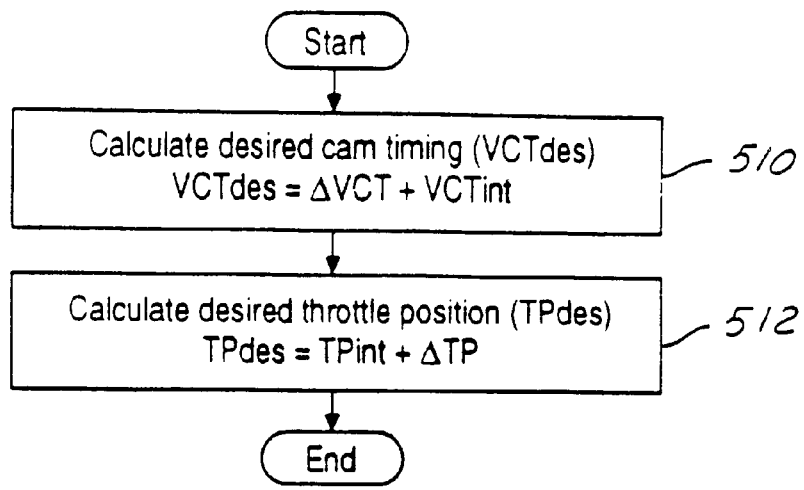

Regarding FIG. 5, the routine is described for calculating the desired cam timing and desired throttle position. First, in step 510, a desired cylinder, desired cam timing (VCTdes) is determined based on the desired change in cam timing and intermediate cam timing. Next, in step 512, the desired throttle position (TPdes) is determined based on intermediate throttle position and desired change in throttle position.

However, when a cam timing position is desired that is greater than a maximum possible cam timing, or when a minimum cam timing is less than a minimum possible cam timing, desired cam timing (VCTdes) is clipped to the maximum or minimum value. In other words adjustment of cam timing may not be able to provide the desired increase, or decrease in cylinder air charge. In this case, cam timing is clipped to the achievable limit value and throttle position is relied upon to provide control.

Steady State Constraints

As described above herein with particular reference to FIGS. 3–5, a control method for controlling engine airflow, or engine torque, and thereby engine speed was described. In addition, the method included a method for rapidly controlling cylinder charge using both an inlet and outlet control device, while also relatively slowly controlling the outlet control device to a nominal position. Both of these process are now further illustrated using both FIGS. 6 and 7.

Figure 6:
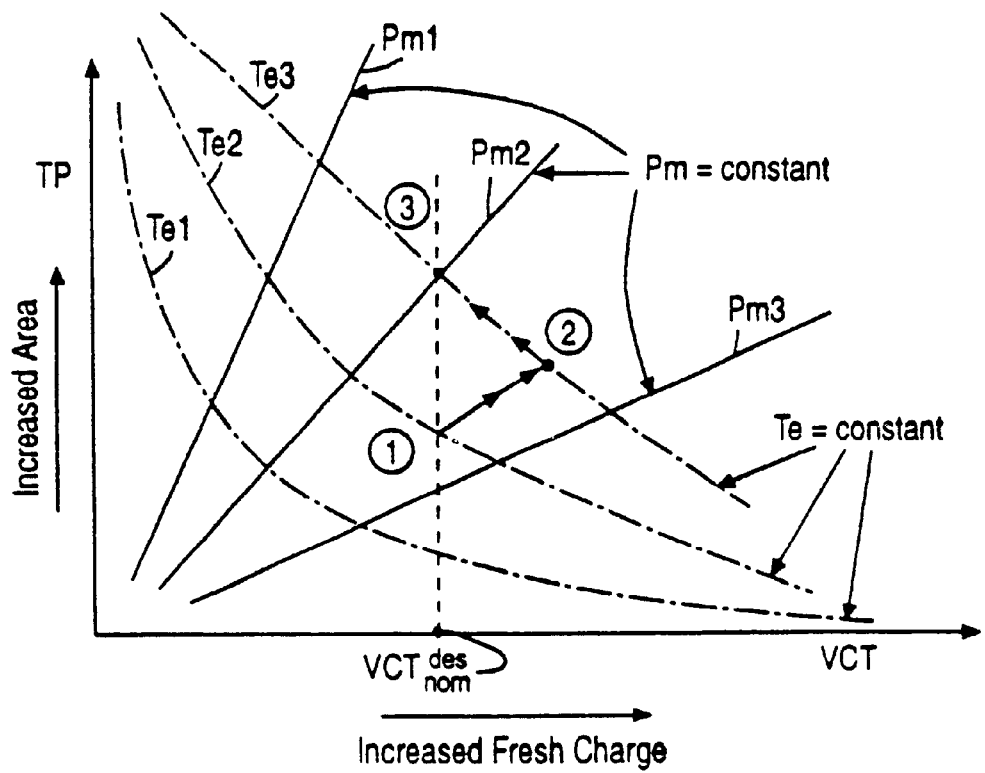
FIG. 6 is a graph showing how various factors are related to engine operation according to the present invention.

Referring now to FIG. 6, a graph is shown with throttle position (TP) on the vertical axis and cam timing (VCT) on the horizontal axis. Dash dotted lines are shown for constant values of engine torque (Te), assuming stoichiometric conditions, while solid lines show constant value of manifold pressure. According to the present invention, the engine can quickly change operating points along the lines of constant pressure (thereby rapidly changing engine airflow and torque) since there are no manifold dynamics in this direction. However, the engine can change only relatively slowly along the dash dotted lines if air/fuel ratio is fixed (for example at stoichiometry). The dashed vertical line represents the nominal desired cam timing for the given operating conditions. For example, the nominal timing for idle conditions, or the nominal timing for the current desired engine torque.

In other words, manifold dynamics represent dynamics associated with changing manifold pressure and explain why flow entering the cylinder is not always equal to flow entering the manifold. Manifold pressure cannot instantly change due to manifold volume. As manifold volume increases, manifold dynamics become slower. Conversely, as manifold volume decreases, manifold dynamics become faster. Thus, manifold dynamics, or manifold delay, is a function of manifold volume. As described above, when moving along lines of constant pressure, manifold dynamics are essentially immaterial. Therefore, flow changes are not limited by manifold dynamics when inlet and outlet control devices are changed to affect flow in similar directions. By changing inlet and outlet control devices faster than manifold dynamics to increase along both the abscissa and ordinate of FIG. 6, cylinder flow changes faster than manifold dynamics. Stated another way, cylinder flow changes faster than it would if only the inlet control device changed infinitely fast. When inlet and outlet control devices are changed to affect flow in opposite directions, cylinder charge can be kept constant. In particular, both the inlet and outlet control devices are changed slower than manifold dynamics since manifold pressure is changed. This is particular useful when engine airflow, or engine torque, is to be kept relatively constant yet it is desired to place either the inlet control device or the outlet control device in a specified location.

Figure 7:
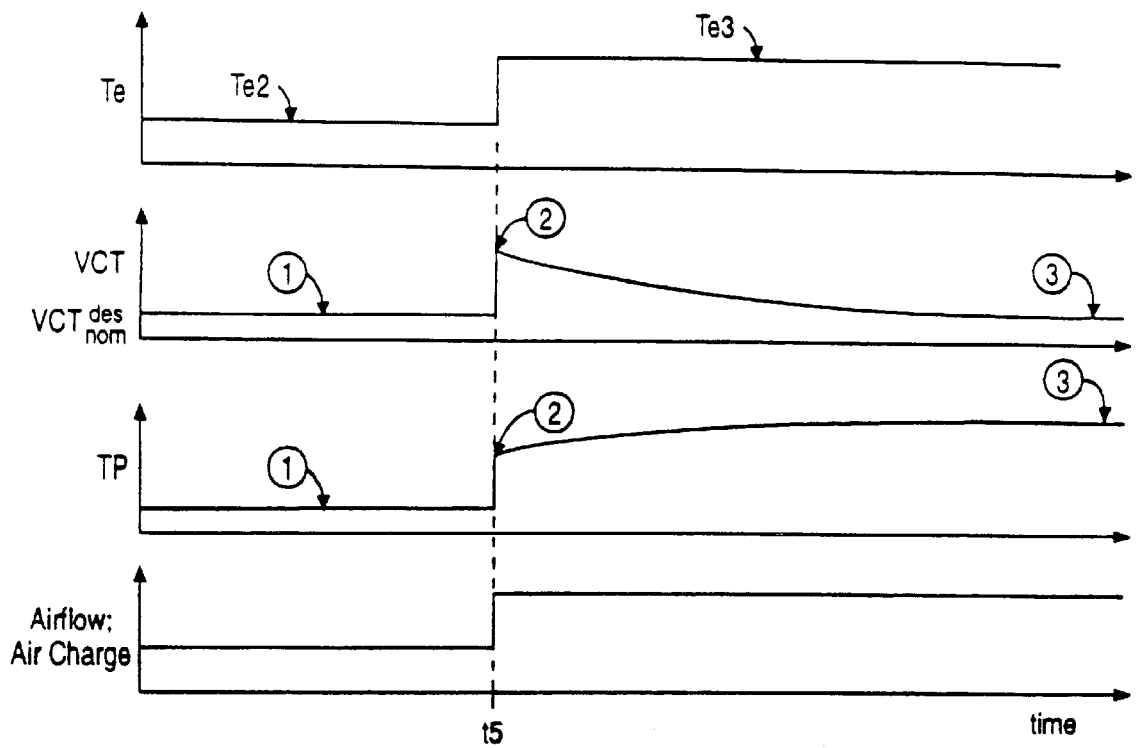
FIG. 7 is a graph depicting results using the present invention.

Referring now to both FIGS. 6 and 7, an example of operation according to an aspect of the present invention is now described. First, the system is operating at point 1. For example, the desired engine torque (Ted) is Te2, or this happens to be the engine torque to maintain a desired engine speed. Then, either the desired engine torque (Ted) changes to Te3, or a torque disturbance causes an engine speed to drop, thereby requiring an increase in engine torque to Te3 to maintain the desired engine speed. At this point (time t5), controller 12 causes both the throttle position and cam timing to change so that the engine system quickly moves to point 2. Next, in order to maintain cam timing and the nominal cam timing, controller 12 causes both the throttle position and cam timing to move to point 3 at a rate slower than the manifold dynamics.

Thus, according to the present invention, throttle position and cam timing are caused to move in the following way. When it is desired to rapidly increase cylinder air charge irrespective of manifold volume: 1) throttle position moves in a way that causes an increase in throttle opening area, and 2) cam timing is adjusted in a way to increase the inducted cylinder air charge for a given manifold pressure moved. Similarly, when it is desired to rapidly decrease cylinder air charge irrespective of manifold volume: 1) throttle position moves in a way that causes a decrease in throttle opening area, and 2) cam timing is adjusted in a way to decrease the inducted cylinder air charge for a given manifold pressure. Thus, it is possible to rapidly change and maintain flow into the cylinder by this combined action.

However, when it is desired to maintain cylinder air charge and either increase throttle opening or cause cam timing to move so that less air charge is inducted for a given manifold pressure, or both, 1) throttle position moves in a way that causes an increase in throttle opening area, and 2) cam timing is adjusted in a way to decrease the inducted cylinder air charge for a given manifold pressure. Thus, cylinder charge can be kept constant by this opposing action. Alternatively, when it is desired to maintain cylinder air charge and either decrease throttle opening or cause cam timing to move so that more air charge is inducted for a given manifold pressure, or both, 1) throttle position moves in a way that causes a decrease in throttle opening area, and 2) cam timing is adjusted in a way to increase the inducted cylinder air charge for a given manifold pressure. Again, cylinder charge can be kept constant by this opposing action.

Such coordinated control is advantageous in that steady state optimization constraints on cam timing can be provided while still providing the ability to control cylinder air charge rapidly.

Engine Torque Control

Figure 8:
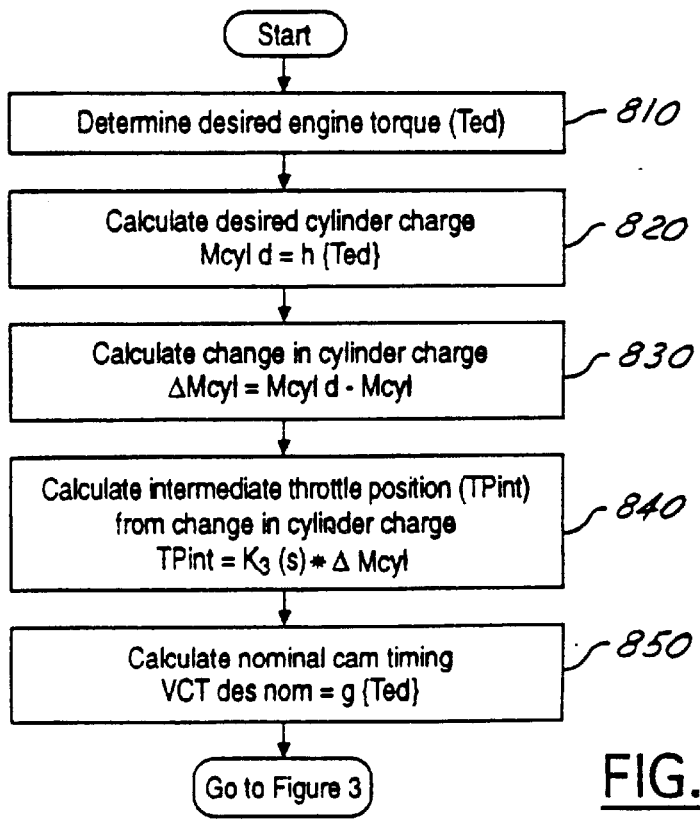

Referring now to FIG. 8, a routine is described for controlling engine torque rather than engine speed as described in FIG. 3. Engine torque control according to the present invention may be used for various reasons, including normal driving operating, traction control, and/or cruise control. In other words, FIG. 8, along with FIGS. 3–5 can be used to control engine torque, where steps 310–330 are replaced by FIG. 8. Regarding FIG. 8, first, in step 810, a desired engine torque (Ted) is determined. Those skilled in the art will recognize that desired engine torque (Ted) can be determined in various ways. For example, desired engine torque (Ted) can be determine from desired wheel torque and gear ratio, from pedal position and vehicle speed, from pedal position and engine speed, or any other method known to those skilled in the art. Then, in step 820, desired cylinder charge (mcyld) is determined based on a function (h) of desired engine torque (Ted). Function (h) is based on a desired air/fuel ratio, such as stoichiometric conditions.

Continuing with FIG. 8, in step 830, desired change in cylinder charge (Dmcyl) is determined based on the difference between desired cylinder charge (mcyld) and actual cylinder charge (mcyl). Then, in step 840, intermediate throttle position (Tpint) is calculated from desired change in cylinder charge (Dmcyl) and controller K3. As described above, various controllers can be used for controller K3. In a preferred embodiment, controller K3 is an integral controller. Then, in step 850, a nominal cam timing (VCTdesnom) if determined based on function (g) and desired engine torque (Ted). Then, the routine continues to step 340 in FIG. 3.

Alternative Embodiment for Cylinder Charge, Torque, and Engine Speed Control

Figure 9:
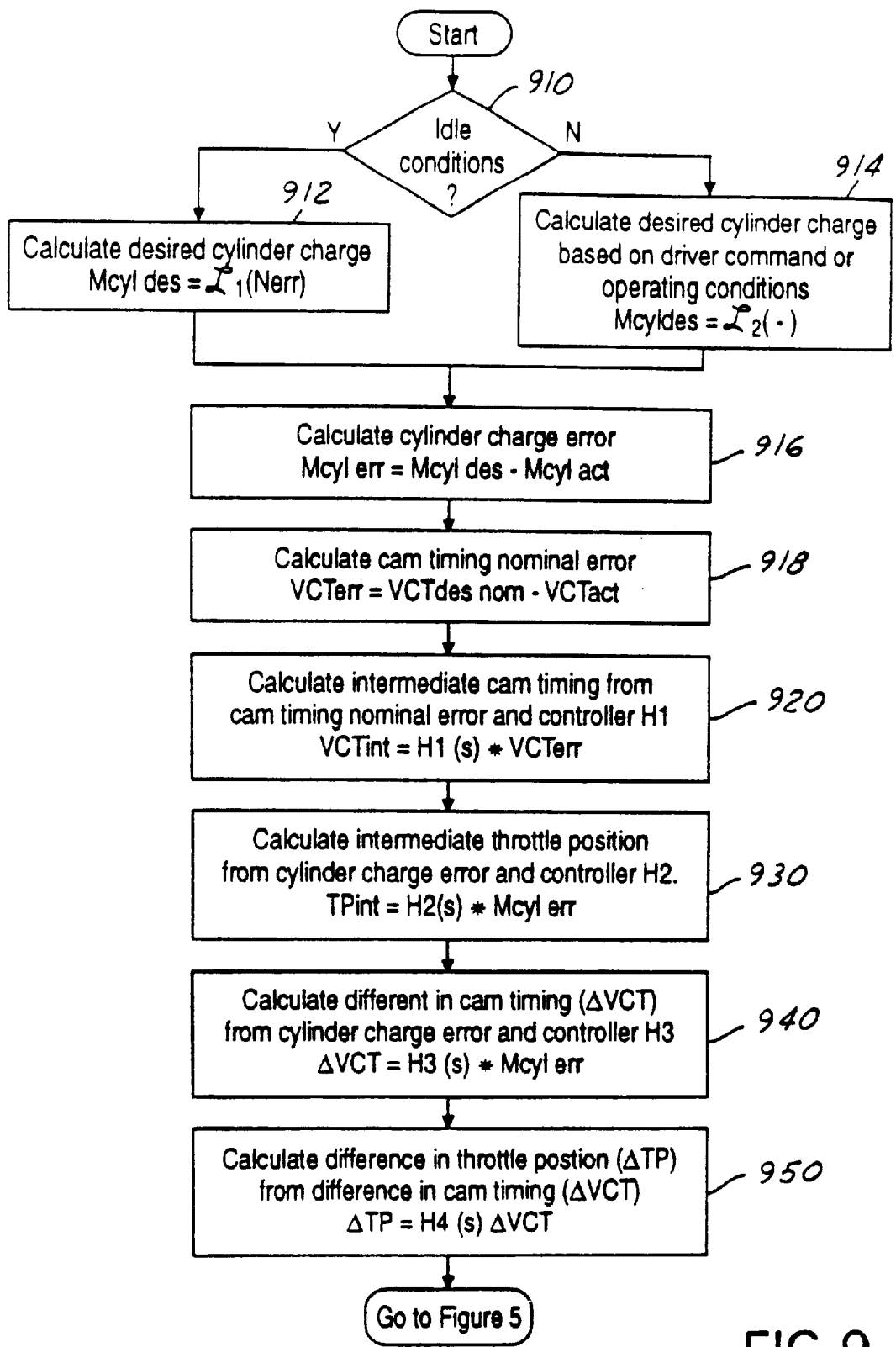

An alternative embodiment is now described that can be used to control either cylinder air charge, Engine Torque at a given air/fuel ratio, or engine speed. Referring now to FIG. 9, in step 910, a determination is made as to whether the engine is currently in an idle condition. Those skilled in the art will recognize various methods for determining idle conditions such as accelerator pedal position, engine speed, and various other factors. When the answer to step 910 is YES, the routine continues to step 912. In step 912, the desired cylinder charge (mcyldes) based on an engine speed error (Nerr). The desired cylinder charge is calculated using function L1, which can represent any function such as, for example, engine speed error multiplied by a constant gain, which is the preferred embodiment. Otherwise, when the answer to step 910 is NO, the routine continues to step 914. In step 914, the desired cylinder charge is calculated based on either a driver command or operating conditions using function (L2). Those skilled in the art will recognize various methods for calculating a desired cylinder charge from a driver command such as, for example, to provide a desired engine torque, a desired wheel torque, an engine output, or provide any other condition requested by the driver. Those skilled in the art will also recognize various operating conditions that can affect a desired cylinder charge such as, for example, engine starting conditions, cold conditions, or cranking conditions.

Continuing with FIG. 9, the routine continues from either step 912 or step 914 to step 916. In step 916, a cylinder charge error (mcylerr) is calculated based on desired cylinder charge and actual cylinder charge (mcylact). Next, in step 918, cam timing nominal error is calculated. Next, in step 920, intermediate cam timing is calculated from cam timing nominal error and controller H1. In a preferred embodiment, controller H1 is an integral controller known to those skilled in the art. Also, in a preferred embodiment, the gains of controller H1 are determined so that the cam timing is adjusted slower than manifold dynamics. In other words, the gains of controller H1 are determined based on manifold volume, and engine speed. However, controller H1 can be any controller known to those skilled in the art such as, for example, a PID controller, a PI controller, or a P controller. Next, in step 930, intermediate throttle position is calculated from cylinder charge error and controller H2. In a preferred embodiment, controller H2 is an integral controller; however, as those skilled in the art will recognize, various controllers can be used. Next, in step 940, a difference in cam timing is calculated from cylinder charge error and controller H3. In a preferred embodiment, controller H3 is a lead controller or a high pass filter type controller. Next, the routine continues to step 950, where a difference in throttle position is calculated from the difference in cam timing using controller H4. In a preferred embodiment, controller H4 is simply a constant gain. Next, the routine continues to FIG. 5.

Air/Fuel Constraints in Lean Conditions

Figure 10:
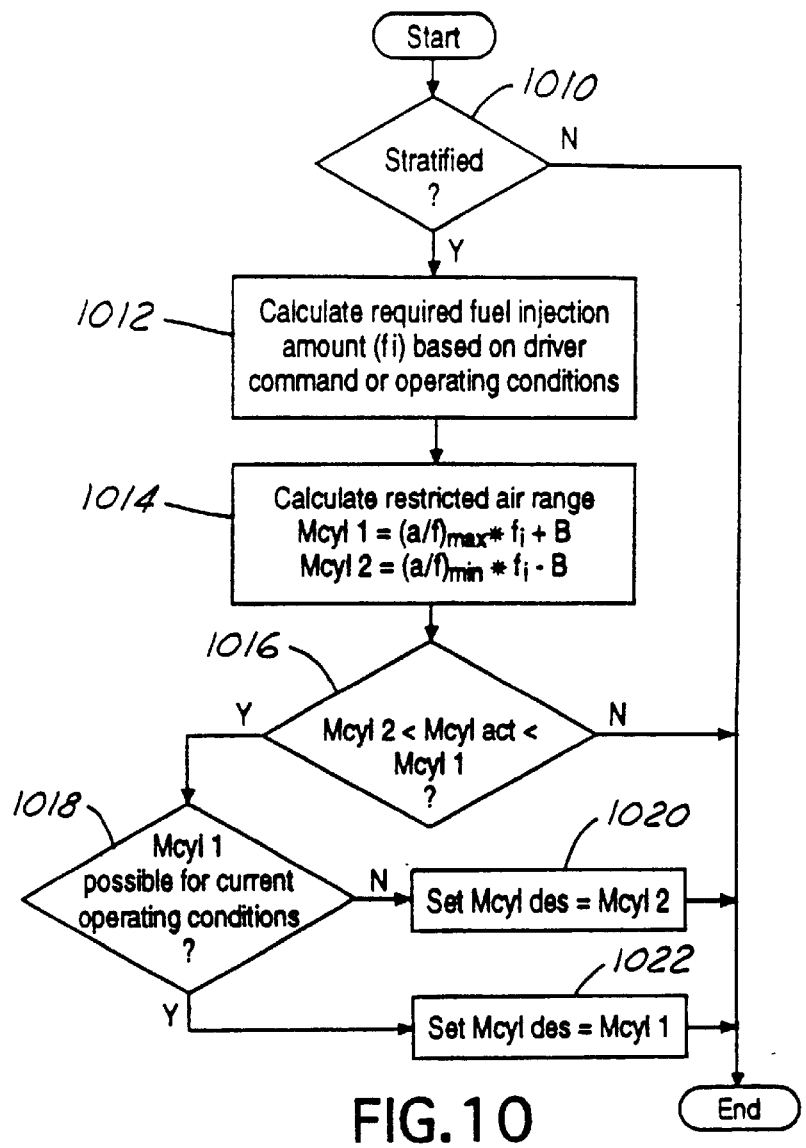

Referring now to FIG. 10, a routine for restricting air/fuel ratio to specific regions is described. In step 1010, a determination is made as to whether the engine is operating in stratified conditions. When the answer to step 1010 is YES, the routine continues to step 1012. In step 1012, the required fuel injection amount (fi) is calculated based on driver commands or operating conditions. Again, those skilled in the art will recognize various methods for determining a fuel injection amount based on driver command or engine operating conditions. Next, the routine continues to step 1014, where a restricted air range is calculated. The restricted air range is calculated using a maximum and minimum allowable air/fuel ratio, the fuel injection amount, and a band parameter (B). The band parameter is used to allow room for calculation inaccuracies. Next, the routine continues to step 1016, where a determination is made as to whether actual cylinder charge is between the maximum and minimum allowable cylinder charges (mcyl1, mcyl2). When the answer to step 1016 is YES, a determination is then made in step 1018 as to whether it is possible, given the current operating conditions, to produce air charge (mcyl1). This determination can be made based on factors such as, for example, engine speed and atmospheric pressure. In particular, as atmospheric pressure increases, engine 10 is able to pump a greater maximum air amount. Therefore, in a preferred embodiment, limit mcyl1 is selected when atmospheric pressure is greater than a calibrated value, and mcyl2 is selected otherwise. In other words, in step 1018, a determination is made as to whether the engine can physically produce upper air charge (mcyl1). When the answer to step 1018 is NO, the routine sets the desired cylinder charge (mcyldes) equal to lower air charge (mcyl2) in step 1020. Otherwise, the desired cylinder charge is set to upper cylinder charge (mcyl1).

Referring now to FIG. 11, the present invention is compared to prior art approaches in controlling engine torque or keeping an air/fuel ratio outside of a restricted air/fuel ratio range. The FIGS. 11a through 11f show a comparison of the present invention as represented by solid lines, and prior approaches as represented by dashed lines. In prior approaches, as shown in FIG. 11a, fuel injection amount increases at time T6 in response to a change in desired engine torque shown in FIG. 11d. To maintain the air/fuel ratio at a desired point, as shown in FIG. 11e, increased airflow is required. To provide increased airflow, prior approaches change throttle position, as shown in FIG. 11c, at time T6. However, because of airflow dynamics due to the manifold volume, air charge does not increase fast enough, as shown in FIG. 11f. This results in a temporary excursion in the air/fuel ratio into the restricted region as shown in FIG. 11e. Thus, the prior approaches cannot keep the air/fuel ratio completely out of the restricted region.

Figure 11A:
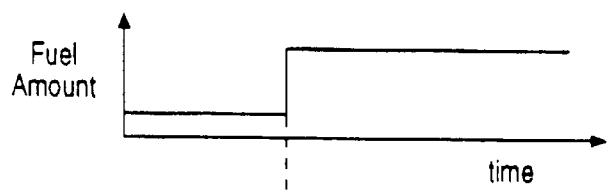
FIGS. 11A–11F are graphs describing operation of an embodiment of the present invention.
Figure 11B:
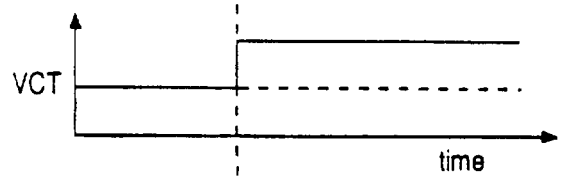
Figure 11C:
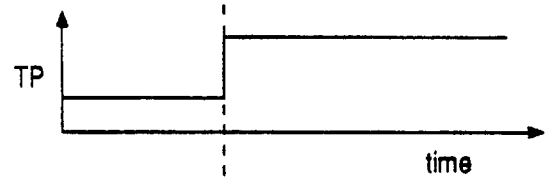
Figure 11D:
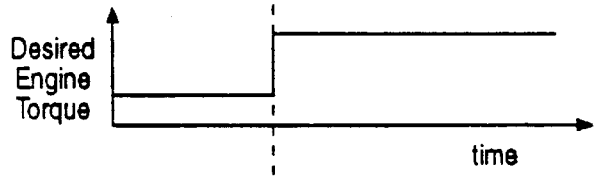
Figure 11E:
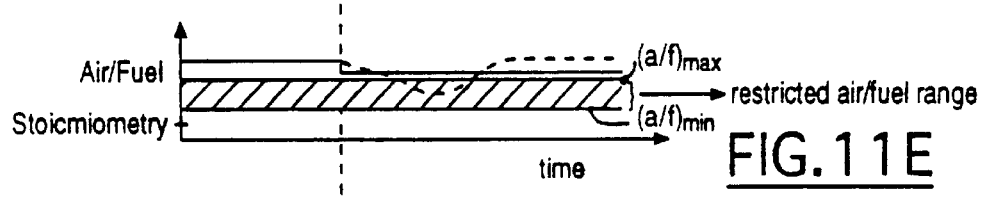
Figure 11F:
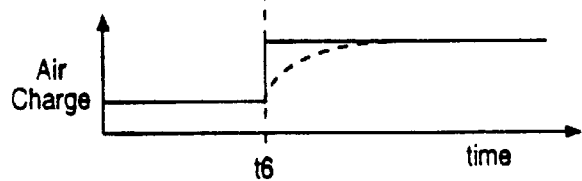

According to the present invention, and as described in FIG. 10, at time T6, cam timing, as shown in FIG. 11b, is also increased. This allows the air/fuel ratio, as shown in FIG. 11e, to refrain from entering the restricted air/fuel range. This is possible since the airflow was quickly changed using both cam timing and throttle position as shown in FIG. 11f by the solid line.

Vehicle Launch Improvement

Figure 12:
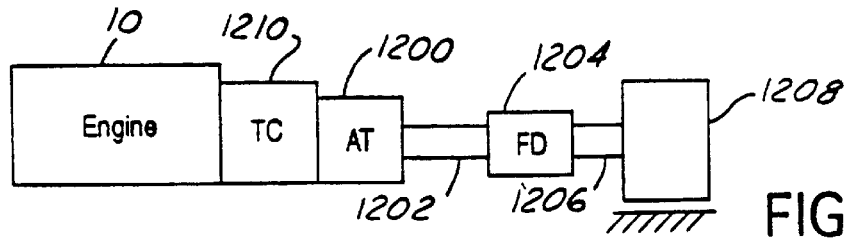

Vehicle driveability is improved according to the present invention by providing engine torque increases at a rate faster than available by prior art methods. Regarding FIG. 12, engine 10 is coupled to automatic transmission (AT) 1200 via torque converter (TC) 1210. Automatic transmission (AT) 1200 is shown coupled to drive shaft 1202, which in turn is coupled to final drive unit (FD) 1204. Final drive unit (FD) is coupled wheel 1208 via second drive shaft 1208. In this configuration, engine 10 can be somewhat downsized and still produce acceptable drive feel by controlling engine torque or airflow using both throttle position and cam timing as describe above herein.

Figure 13:
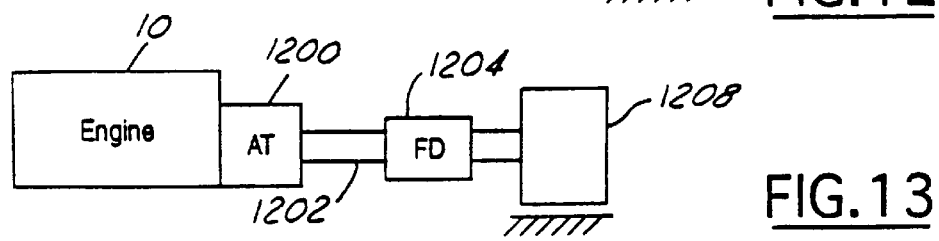

Regarding FIG. 13, torque converter 1210 is removed. Thus, even without downsizing engine 10, using prior approaches driveability is reduced. In other words, vehicle launch is normally assisting from torque multiplication provided by torque converter 1210. Without torque converter 1210, vehicle launch feel is degraded. To compensate for the lack of torque converter 1210, engine 10 is controlled according to the present invention using both throttle position and cam timing to rapidly increase engine torque or airflow, thereby improving drive feel and allowing elimination of torque converter 1210.

In a preferred embodiment, during vehicle launch at low vehicle speed and low engine speed, both inlet control device and outlet control device 170 and 171 are coordinated to rapidly control engine cylinder charge, thereby improving drive feel. Further to enable such operating, nominal cam timing (VCTdesnom) is set to a value where a large potential increase in cylinder air charge can be achieved when the transmission is in drive and vehicle speed is below a predetermine vehicle speed indicating potential for vehicle launch.

Turbo Lag Compensation

Figure 14:
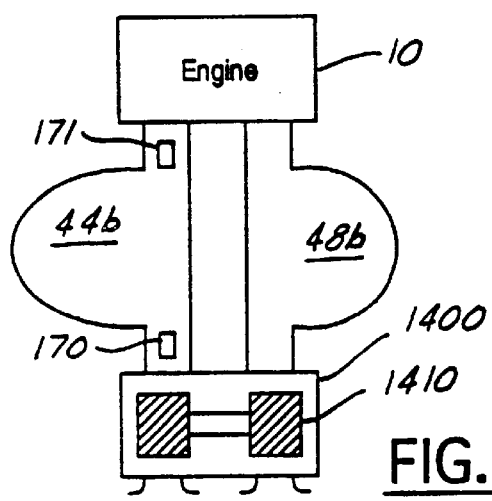
FIGS. 12 and 14 are a block diagrams of an embodiment in which the invention is used to advantage.

Referring now to FIG. 14, a configuration is shown where engine 10 is coupled to a compression device 1400. In a preferred embodiment, compression device 1400 is a turbocharger. However, compression device 1400 can be any compression device such as, for example, a supercharger. Engine 10 is shown coupled to intake manifold 44b and exhaust manifold 48b. Also shown is outlet control device 171 coupled between intake manifold 44b and engine 10. Inlet control device 170 is also shown coupled between intake manifold 44b and compression device 1400. Compression device 1400 contains compressor 1410.

According to the present invention, it is now possible to compensate for delays related to turbo lag. In a preferred embodiment, during vehicle launch at low vehicle speed and low engine speed, both inlet control device and outlet control device 170 and 171 are coordinated to rapidly control engine cylinder charge, thereby compensating for the delayed pressure buildup from compression device 1400. However, such an approach can be used throughout various driving conditions, such as, for example, during highway cruising operation.

While the invention has been shown and described in its preferred embodiments, it will be clear to those skilled in the arts to which it pertains that many changes and modifications may be made thereto without departing from the scope of the invention. For example, as described above herein, any device that affects flow exiting intake manifold 44 and entering cylinder 30 can be used as an outlet control device. For example, a swirl control valve, a charge motion control valve, an intake manifold runner control valve, or an electronically controlled intake valve can be used according to the present invention to rapidly change cylinder fresh charge. Further, any device that affects flow entering intake manifold 44 can be used in place of intake control device. For example, an EGR valve, a purge control valve, or an intake air bypass valve can be used in conjunction with the outlet control device so rapidly change cylinder fresh charge.

Also, the invention can be applied to any situation where engine cylinder charge needs to be controlled faster than manifold dynamics would normally allow. Accordingly, it is intended that the invention be limited only by the following claims.

We claim:

1. A method for controlling an engine airflow, the engine having at least one cylinder, the engine also having an intake manifold and an outlet control device for controlling flow from the intake manifold into the cylinder, comprising:

generating a desired flow into the cylinder; and adjusting the outlet control device to provide said desired flow into the cylinder, wherein the outlet control device is a variable cam timing system.

2. A system for controlling airflow into an engine having at least one cylinder, the engine coupled to an intake manifold, the system comprising:
- an outlet control device that affects flow from the intake manifold into the cylinder of the engine, said outlet control device being a variable cam timing system; and
- a controller for generating a desired flow into the cylinder; and adjusting said outlet control device to provide said desired flow into the cylinder.

3. A system for controlling airflow into an engine having at least one cylinder, the engine coupled to an intake manifold, the system comprising:
- a variable cam timing system that affects flow from the intake manifold into the cylinder of the engine; and
- a controller for generating a desired flow into the cylinder; and adjusting said variable cam timing system to provide said desired flow into the cylinder.

4. A system for controlling airflow into an engine having at least one cylinder, the cylinder having at least an intake valve and an exhaust valve, the engine coupled to an intake manifold, the system comprising:
- a variable cam timing system having a hydraulically powered actuator to adjust at least one of an opening and a closing time of at least one of the intake and exhaust valves of the engine, said variable cam timing system affecting flow from the intake manifold into the cylinder of the engine; and
- a controller for generating a desired flow into the cylinder; and adjusting said variable cam timing system to provide said desired flow into the cylinder.

5. A system for controlling airflow into an engine having at least one cylinder, the engine coupled to an intake manifold, the system comprising:
- an outlet control device that affects flow from the intake manifold into the cylinder of the engine, said device coupled between the engine and the intake manifold, said device being a variable cam timing system; and
- a controller for generating a desired flow into the cylinder; and adjusting said outlet control device to provide said desired flow into the cylinder.

6. A system for controlling airflow into an engine having at least one cylinder, the engine coupled to an intake manifold, the system comprising:
- an outlet control device that affects flow from the intake manifold into the cylinder of the engine, said device being at least one of an intake valve or an exhaust valve of the cylinder; and
- a controller for generating a desired flow into the cylinder; and adjusting said outlet control device to provide said desired flow into the cylinder.

7. The system recited in claim 6 wherein said device is a variable cam timing system.

8. A system for controlling airflow into an engine having at least one cylinder, the engine coupled to an intake manifold having at least an inlet and an outlet, the system comprising:
- an outlet control device coupled to the manifold outlet that affects flow from the intake manifold into the cylinder of the engine;
- an inlet control device coupled to the manifold inlet that affects flow into the intake manifold; and
- a controller for generating a desired flow into the cylinder; and adjusting at least said outlet control device to provide said desired flow into the cylinder.

9. The system recited in claim 8 wherein said outlet control device is a variable cam timing system.

10. The system recited in claim 8 wherein said inlet control device is a throttle.

11. The system recited in claim 9 wherein said inlet control device is a throttle.

12. The system recited in claim 8 wherein said outlet control device is at least one of an intake valve or an exhaust valve of the cylinder.

13. The system recited in claim 12 wherein said inlet control device is a throttle.

14. The system recited in claim 8 wherein said controller further adjusts said inlet control device.

15. A system for controlling airflow into an engine having at least one cylinder, the engine coupled to an intake manifold, the system comprising:
- an outlet control device that affects flow from the intake manifold into the cylinder of the engine, said device being at least one of an intake valve or an exhaust valve of the cylinder;
- an electronically controlled throttle valve that affects flow into the intake manifold; and
- a controller for generating a desired flow into the cylinder; adjusting said outlet control device to provide said desired flow into the cylinder; and adjusting said inlet control device based at least on an operating condition.

16. A system for controlling airflow into an engine having at least one cylinder, the engine coupled to an intake manifold, the system comprising:
- an outlet control device that affects flow from the intake manifold into the cylinder of the engine, said device being an intake valve of the cylinder;
- an electronically controlled throttle valve that affects flow into the intake manifold;
- a controller for generating a desired flow into the cylinder, adjusting both said electronically controlled throttle valve and said outlet control device to provide said desired flow into the cylinder, and adjusting fuel injection into the engine based at least on an operating condition, said engine combusting a mixture of said airflow and fuel; and
- an emission control device coupled to the engine for treating said combusted mixture.

* * * * *